United States Patent
Pellenc et al.

(10) Patent No.: US 6,585,056 B2
(45) Date of Patent: Jul. 1, 2003

(54) MACHINE WITH A MULTIFUNCTIONAL CHASSIS FOR WORKING THE SOIL IN TREE OR SHRUB PLANTATIONS

(75) Inventors: Roger Pellenc, Pertuis (FR); Robert Delran, Pertuis (FR)

(73) Assignee: Pellenc, S. A., Pertuis (FR)

( * ) Notice: Subject to any disclaimer, the term of this patent is extended or adjusted under 35 U.S.C. 154(b) by 0 days.

(21) Appl. No.: 09/993,327

(22) Filed: Nov. 6, 2001

(65) Prior Publication Data

US 2002/0079110 A1 Jun. 27, 2002

(30) Foreign Application Priority Data

Nov. 27, 2000 (FR) .............................................. 00 15294

(51) Int. Cl.$^7$ ............................................. A01B 59/043
(52) U.S. Cl. ....................... 172/133; 172/446; 172/449; 172/605; 172/679
(58) Field of Search ................................. 172/133, 439, 172/443, 444, 445, 445.2, 446, 447, 448, 449, 605, 677, 679, 680, 684.5, 776

(56) References Cited

U.S. PATENT DOCUMENTS

| | | | | |
|---|---|---|---|---|
| 4,624,471 A | * | 11/1986 | Haines et al. | 280/411 R |
| 5,064,338 A | * | 11/1991 | Lawrence | 414/685 |
| 5,092,422 A | * | 3/1992 | Hood, Jr. et al. | 180/329 |
| 5,394,948 A | * | 3/1995 | Bunnell | 172/677 |
| 5,697,454 A | * | 12/1997 | Wilcox et al. | 172/447 |
| 5,765,649 A | * | 6/1998 | Le Maigat | 172/450 |
| 5,984,019 A | * | 11/1999 | Hund | 172/439 |

* cited by examiner

Primary Examiner—Christopher J. Novosad
(74) Attorney, Agent, or Firm—Harrison & Egbert

(57) ABSTRACT

Machine for working the soil in tree or shrub plantations, consisting of a chassis (1–2) equipped with mechanisms (4–5a, 11, 11) allowing it to be mounted on the universal three-point hitch system of a farm tractor and consisting, laterally, of mechanisms (28a, 28b) permitting the mounting of lateral tools (29A, 29B) allowing the working of the soil near the feet of the aligned trees or shrubs and mechanisms for driving these tools in rotation from the power take-off shaft of the tractor, characterized in that the chassis (1–2) is itself provided with a universal three-point hitch system (4–5b, 13, 13) allowing the mounting, on this chassis, of a second machine that customarily moves in between the rows, for the working or the treatment of the soil, or any other job related to the cultivating of the trees or shrubs.

13 Claims, 9 Drawing Sheets

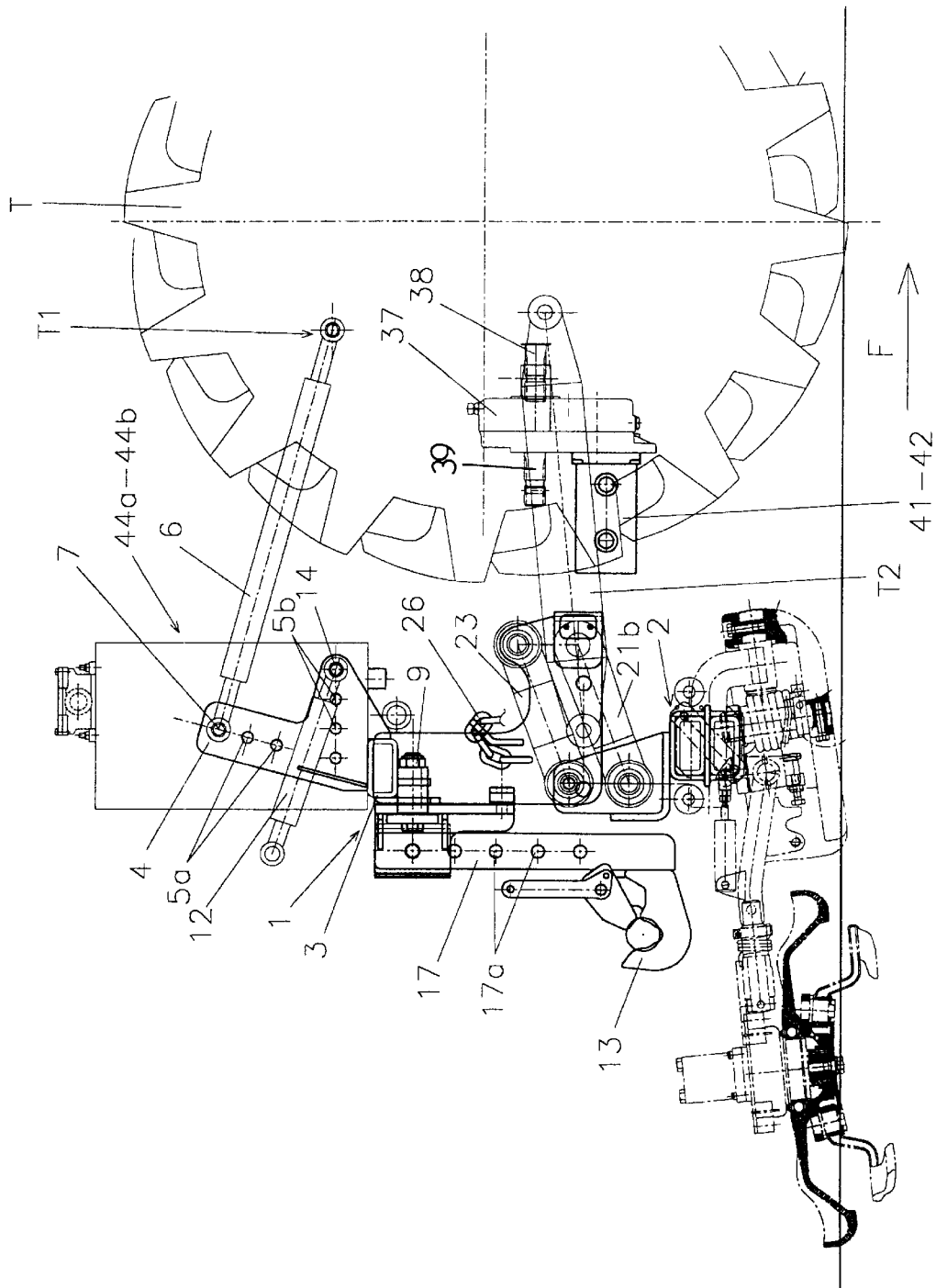
Fig:1

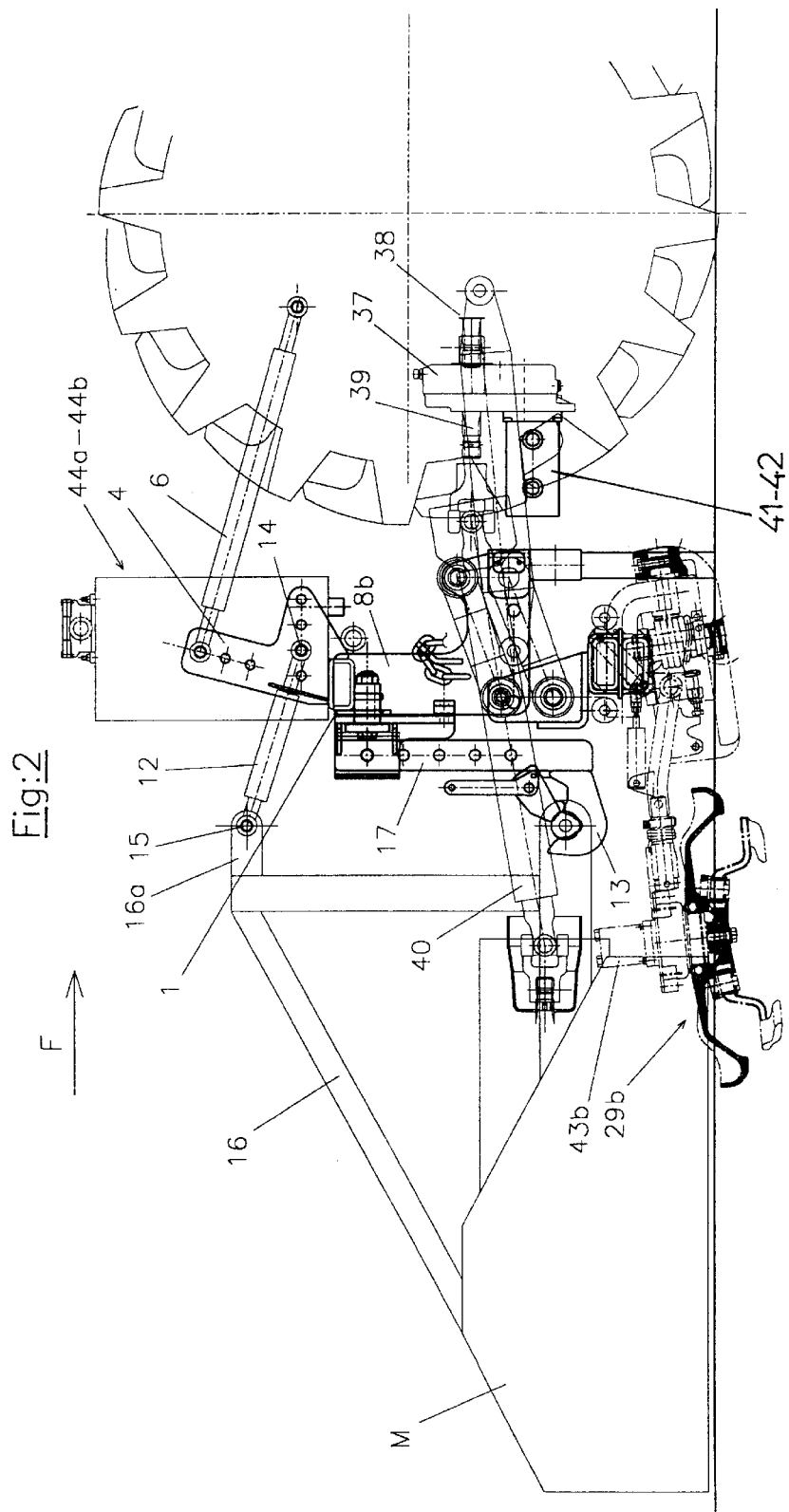

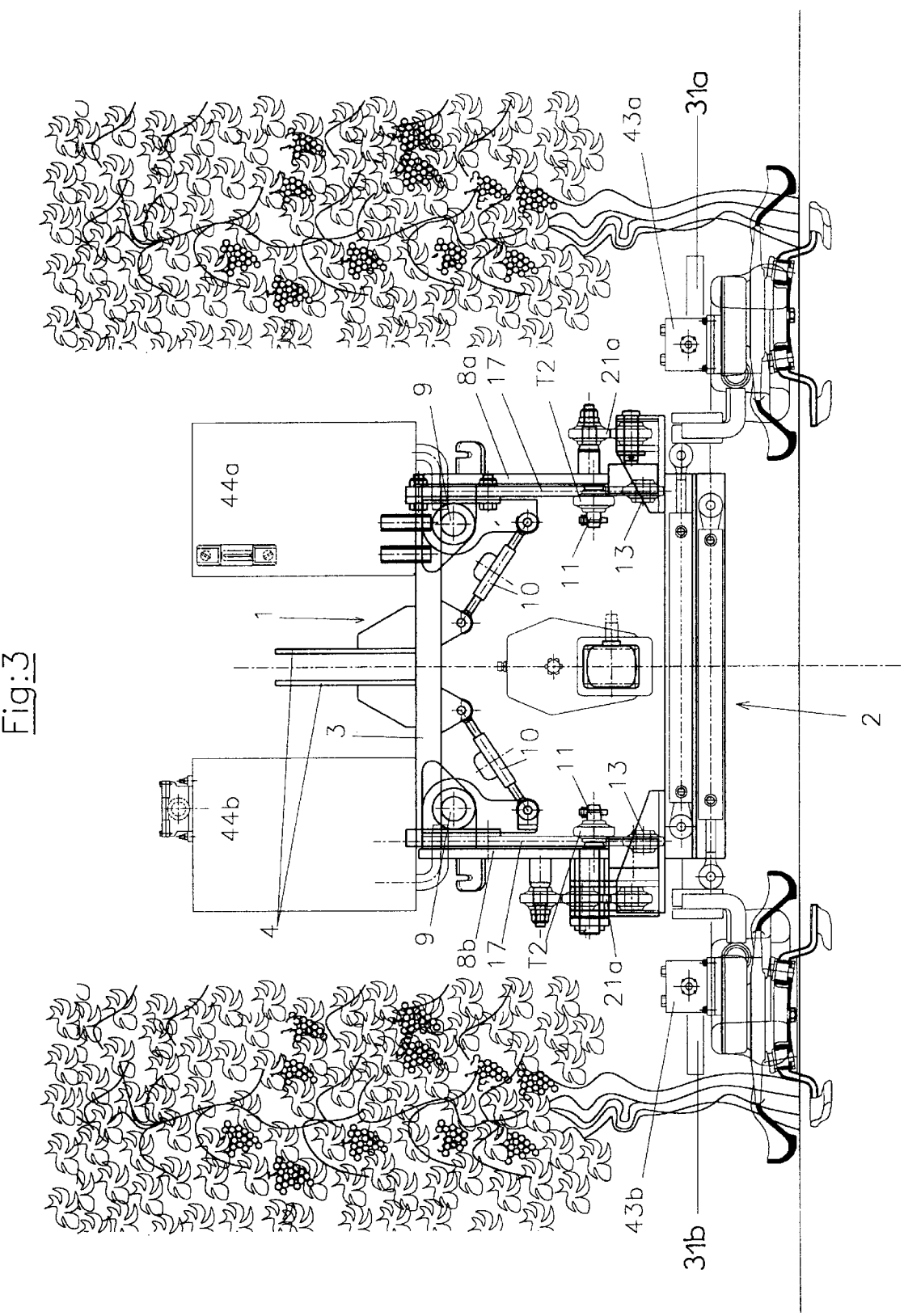

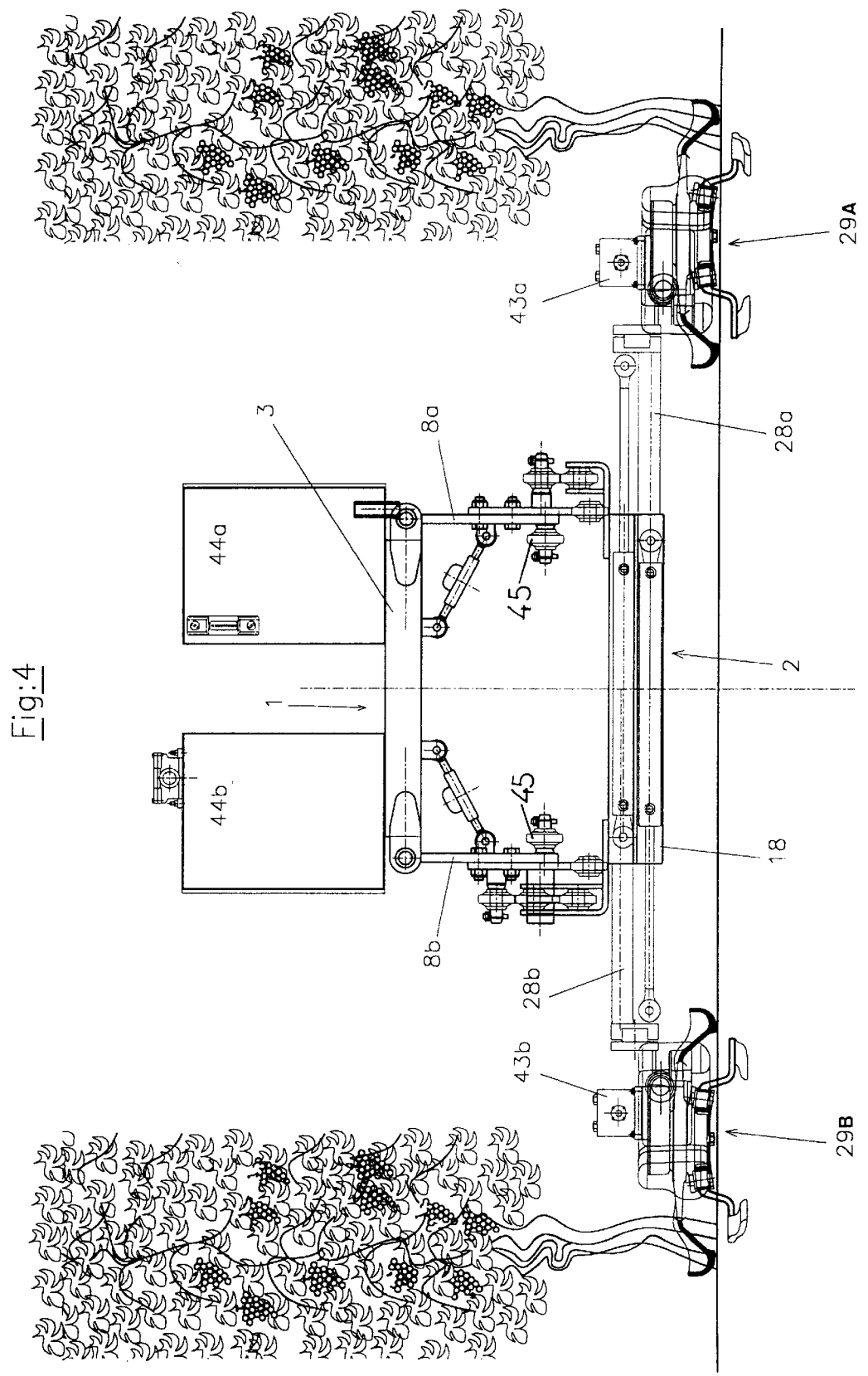

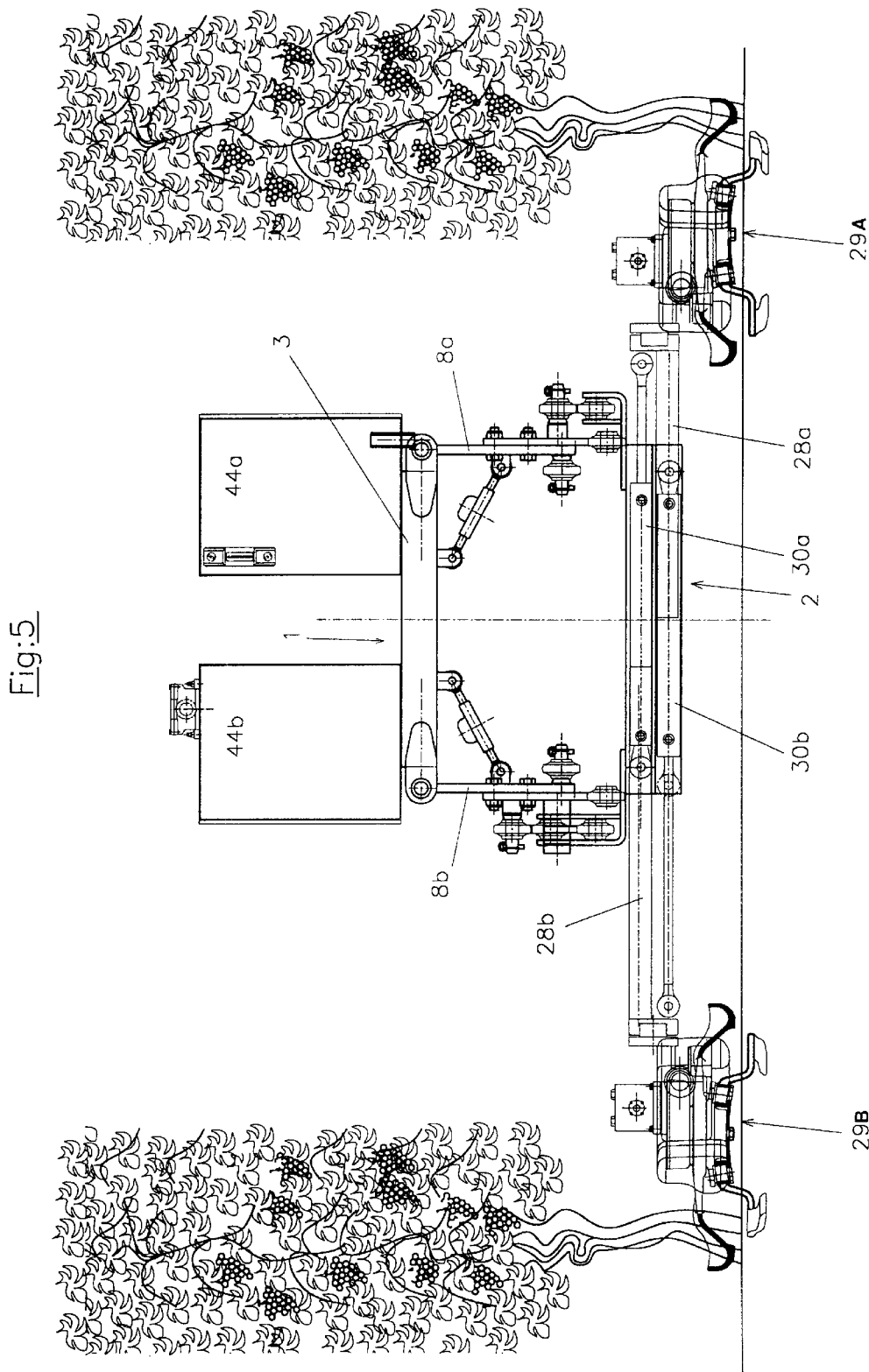

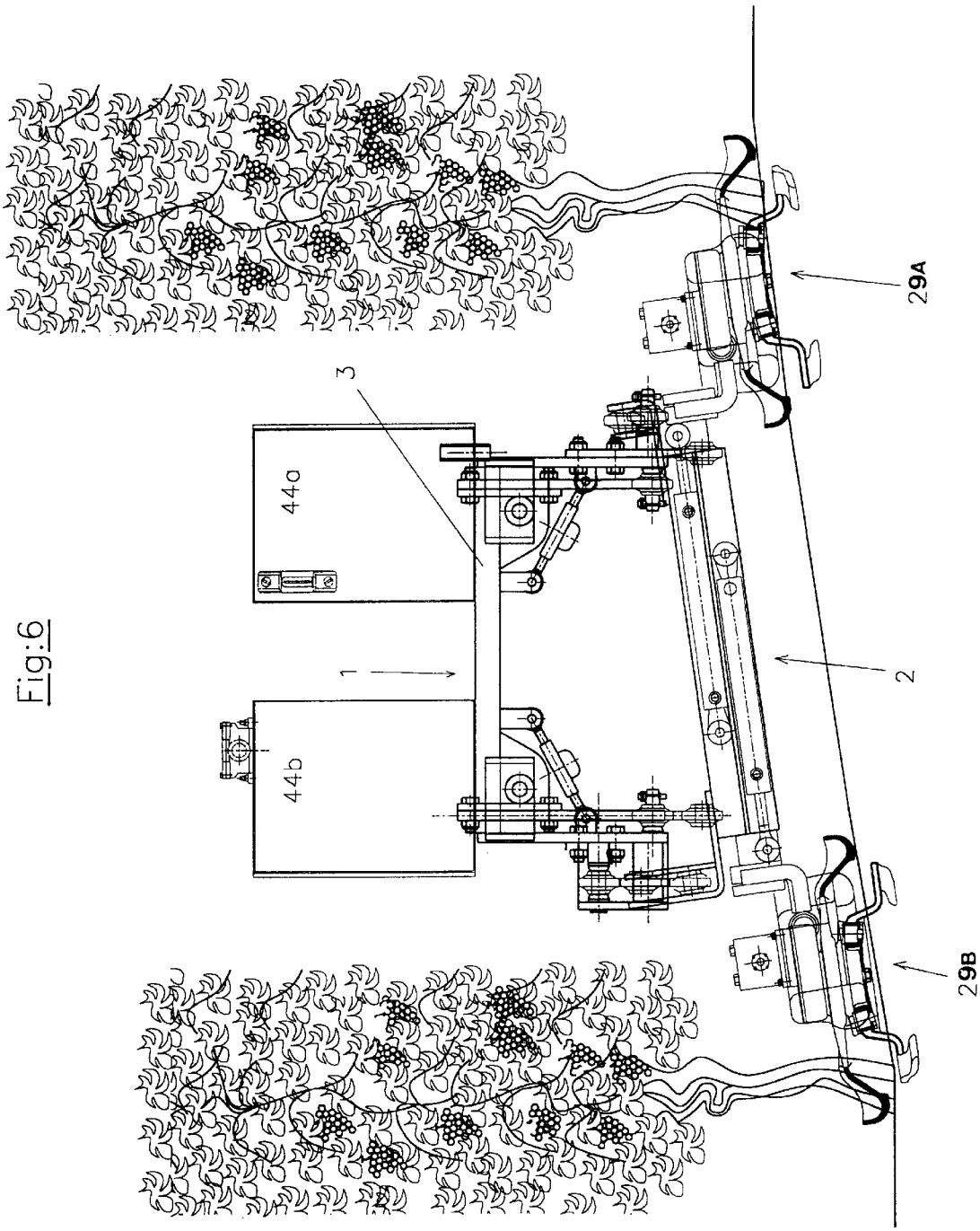

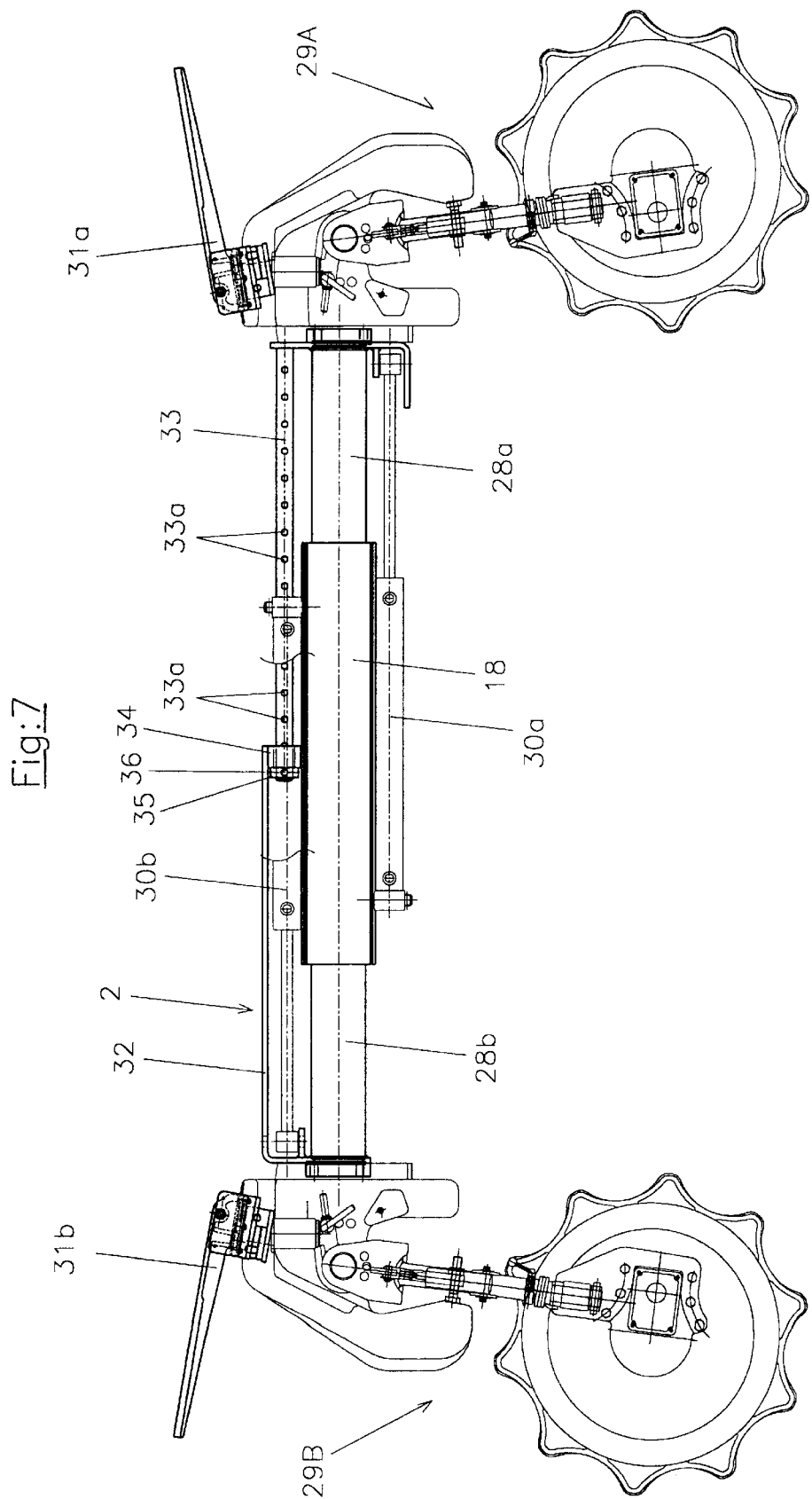
Fig:7

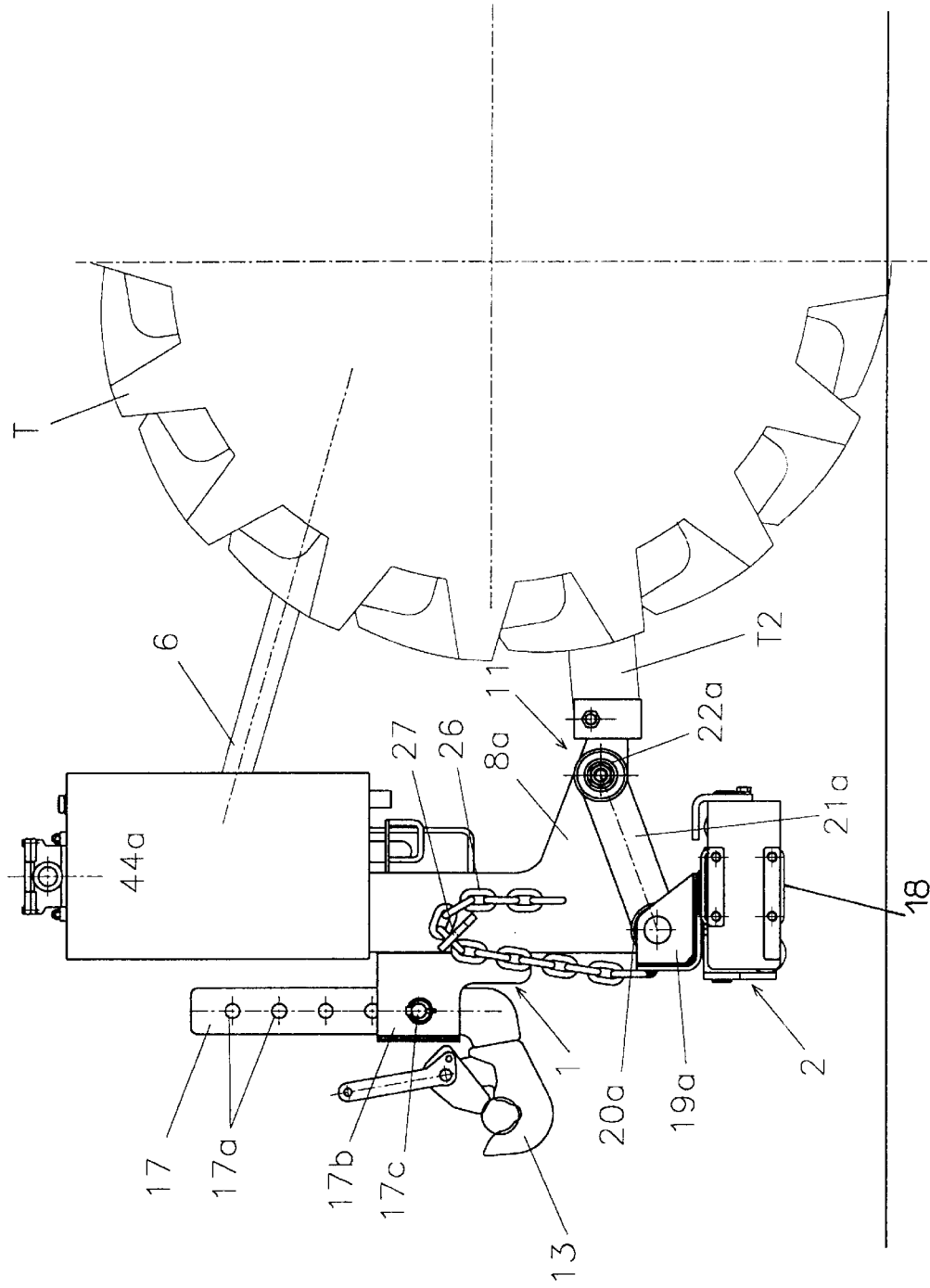
Fig:8

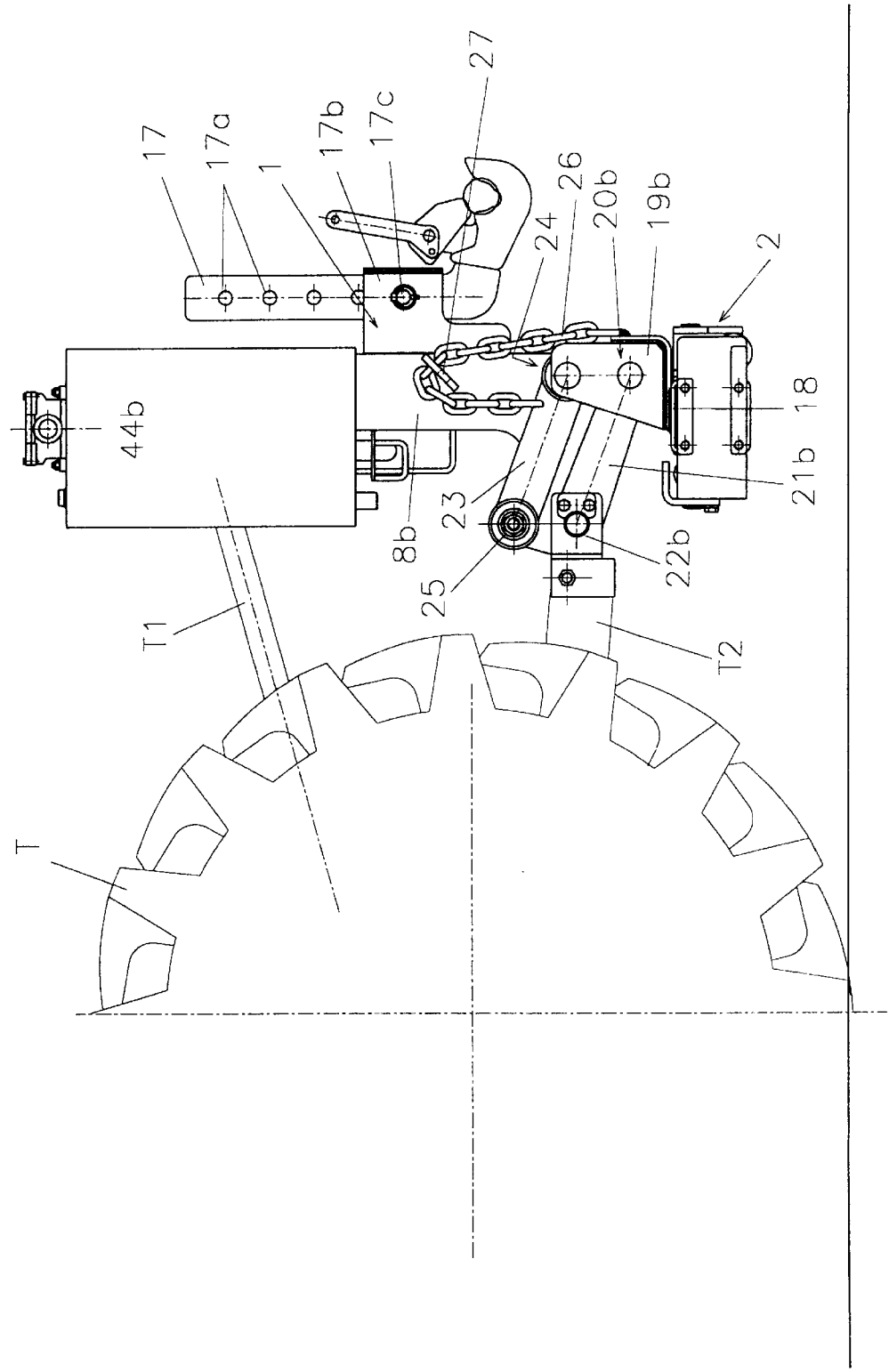
Fig:9

MACHINE WITH A MULTIFUNCTIONAL CHASSIS FOR WORKING THE SOIL IN TREE OR SHRUB PLANTATIONS

BACKGROUND OF THE INVENTION

1. Field of the Invention

The invention presented here involves a machine with a multifunctional chassis for working the soil in plantations of trees or shrubs planted in lines, such as vineyards or orchards. This machine is designed to be mounted behind a farm tractor in order to perform cultivating work or soil treatment work such as, for example, hoeing work or mowing work, or the like, and the mounting, on this multifunctional frame, tools fitted to the nature of the work to be done.

2. Description of Related Art

The universal three-point hitch system of farm tractors allows the mounting, at the rear of the tractors, machines constructed to fulfill specific functions and, notably, machines provided with various tools driven by the power take-off shaft of these tractors and allowing working of soil of a specified nature, either between two rows (inter-row) of trees or shrubs (for example, plowing, hoeing, mowing, etc.) or between the feet (inter-trunk) of the rows of trees or shrubs arranged on each inter-row side in which the tractor is moving.

This situation allows the mounting, at the rear of the tractor, of a single machine fitted to perform well-specified localized work. It does not allow the use of two machines capable of accomplishing work that is identical, complementary, or different, depending on the requirements, at the same time in between the rows and in between the trunks of one or two rows of vine stocks, shrubs, or trees.

BRIEF SUMMARY OF THE INVENTION

The invention intends to solve the problems resulting from the insufficiency mentioned above.

This objective is achieved, according to the invention, using a machine consisting of a chassis equipped, on one of its front sides or side, considering the direction of the movement of the machine during work, with mechanisms allowing its mounting on the universal three-point hitch system of a farm tractor, and consisting of, on the side, mechanisms that allow the mounting of lateral tools driven mechanically or hydraulically, from the power take-off shaft of the tractor and allowing working of the soil near the feet of the aligned shrubs or trees, this machine being characterized in that its chassis is provided on its opposite side or rear side with a universal three-point hitch system that allows the mounting, on this chassis, of a machine for cultivating or treatment usually moving in between the rows.

It is understood that this machine can be equipped, on the side, with tools for working the soil between the vinestocks of the vineyard or the feet of the trees or shrubs of the two rows between which the tractor is moving, and using its multifunctional chassis, it allows, if desired, the mounting of a second machine for cultivating or treatment of the soil, working in between the rows (for example: a winegrower's plow, a harrow, a rotary harrow, a reaper, a sprayer, etc.). With the two machines working simultaneously, the work to be done, whether of a similar or different nature, can be performed in a single passage in between the rows, which allows sizeable gains of time.

According to another characteristic arrangement, the multifunctional chassis of the machine according to the invention consists of, on the one hand, a frame allowing it to be mounted on the universal three-point hitch system of a farm tractor and, on the other hand, a tool-holder supporting the lateral tools of the machine, this tool-holder being suspended in a manner floating from the frame.

Due to this arrangement, the lateral tools of the machine for inter-trunk work, mounted on the universal three-point hitch system of the tractor, and the tools of the machine for working in between the rows mounted on the universal three-point hitch system of the multifunctional chassis of the machine for inter-trunk work, can occupy working positions totally independent from each other relative to the ground, in a manner so that the position of the tools of one of the machines has no harmful influence on the effectiveness of the work performed by the tools of the other one.

According to another characteristic arrangement, the distance between the vertical planes containing the corresponding attachment points of the mechanisms allowing the mounting of the multifunctional chassis on the universal three-point hitch system of a tractor and the attachment points of the universal three-point hitch system of this multifunctional chassis is on the order of 0 to 300 mm.

Due to this arrangement, the length of the train resulting from the mounting of a second machine for working or treating the soil in between the rows, on the multifunctional chassis of the first one, does not cause any appreciable increase of the length of the assemblies formed by a single machine for working in between the rows directly mounted on a tractor. In these conditions, the assembly comprised of the tractor and the two machines for working the soil, can easily maneuver in the vineyards or the orchards and can easily turn at the end of the row, even when the available space is relatively reduced.

According to another characteristic arrangement, the machine having a multifunctional chassis consists of a speed multiplier for driving at least one hydraulic pump for activating at least one tool, the input shaft of this multiplier having, on its front side, a female coupling instrument that allows it to be connected to the fluted shaft of the power take-off of a farm tractor and, on its rear side, a rotary coupling instrument allowing its connection to a cardan drive designed to provide the movement of the tools of a machine working in between the rows mounted on the universal threepoint hitch system of the multifunctional chassis.

Due to this arrangement, the multiplier allows the simultaneous drive of the lateral tools of the machine mounted on the tractor and the tools of the machine for working in between the rows mounted on the multifunctional chassis of it.

According to another characteristic, the machine having a multifunctional chassis according to the invention consists of a tool-holder equipped transversely with mobile arms and whose external ends are laid out in order to support the lateral tools of the machine, the ends being equipped with detectors arranged in front of the tools and acting on the control system of a motorization that provides the synchronized axial displacement of the arms and the recentering of the tools relative to the axis in between rows when one of the detectors encounters an obstacle such as a vinestock of the vineyard, a post of a fence, or trunk of a tree or shrub, during the work.

Due to this arrangement, the lateral tools of the machine always stay centered relative to the axis in between rows.

BRIEF DESCRIPTION OF THE SEVERAL VIEWS OF THE DRAWINGS

The goals, characteristics, and advantages above and even others, are best brought out by the description that follows and the attached drawings, in which:

FIG. 1 is a side view of the machine having a multifunctional chassis according to the invention installed behind a farm tractor on which only one rear wheel and one lifting arm are shown, by means of the device for universal three-point hitch of this tractor.

FIG. 2 is a view similar to FIG. 1 showing the attachment of a machine for working in between the rows on a universal three-point hitch system of the multifunctional chassis of the machine.

FIG. 3 is a rear view of this machine having lateral tools that are shown in the minimum separation distance position.

FIG. 4 is a view similar to FIG. 3 and showing the lateral tools of the machine in their maximum separation distance position.

FIG. 5 is a view similar to FIGS. 3 and 4 and showing the support of the correct working position of the lateral tools, in spite of an appreciable swerve to the right, of the tractor and the fixed chassis of the machine relative to the axis in between rows.

FIG. 6 is a view similar to the preceding ones, showing the position of the tool-holder supporting the lateral tools during the passage of the machine over a banked terrain.

FIG. 7 is a top view of the floating tool-holder supporting the lateral tools.

FIG. 8 is a side view (right side) showing one of the connection mechanisms of the suspension system of the floating tool-holder on the part affixed to the multifunctional chassis of the machine shown in the raised position.

FIG. 9 is a side view (left side) showing the second connection mechanism of the suspension system also shown in the raised position.

DETAILED DESCRIPTION OF THE INVENTION

Reference is made to the drawings in order to describe an embodiment example that is of interest, though not in any way restrictive, of the machine having a multifunctional chassis according to the invention.

It is specified that in the following portion of the disclosure presented here, words are used such as "front", "behind", "right", "left", "transverse", etc., in taking into account the normal direction of movement of the machine during work, designated by the arrow F in FIGS. 1 and 2.

This machine consists of a chassis made up of an upper frame 1 and tool-holder 2 oriented transversally and suspended from the lower part of the frame.

The frame 1 is constructed so as to allow its mounting on the universal three-point hitch system of a traditional farm tractor T. This frame consists of, for example, an upper horizontal beam 3 whose central part is equipped with a cover 4 having approximately the shape of an L and provided with spaced holes 5a, 5b for the passage of one or more attachment axles. This cover 4 makes it possible to join together the upper part of the frame 1 to the upper axial coupling point T1 of the universal three-point hitch system of the tractor, by means of a coupling rod 6 whose ends are fixed, on the one hand, to the cover by means a joint axle 7 engaged in one of the holes 5a of the axle, and, on the other hand, to the axial coupling T1 of the tractor, by means of a joint.

The lateral flanges 8a, 8b are affixed near the ends of the upper beam 3, these flanges extending toward the bottom from the beam.

The lower part of each one of the flanges is equipped with an attachment instrument 11 such as a male jack ring for connecting the frame 1 to the ends equipped with a tie rod end 45 of the coupling arms T2 of a tractor T, consisting of the two other points of the universal coupling system of the tractor.

According to an important arrangement characteristic of the invention, the chassis of the machine, and more specifically, the fixed frame 1 of the chassis is itself provided with a universal three-point hitch system that allows the mounting, behind the chassis, of a second machine that usually moves in between the rows, for working or treating the soil, or any other job linked to the cultivating of trees or shrubs.

This three-point hitch system consists of: on the one hand, the cover 4 that allows the linking of the frame 1 to the chassis of a machine for working in between the rows, by means of a coupling rod 12; and on the other hand, two spaced-apart coupling instruments 13 arranged symmetrically, in a same horizontal plane, below the cover 4.

One of the ends of the coupling rod 12 is connected to the cover 4 by means of a joint axle 14 positioned in one of the pairs of holes 5b, while its opposite end is connected, by means of a joint axle 15, to a cover 16a that the coupling chassis 16 of the machine for working in between the rows has, shown schematically and designated by the reference M in FIG. 2.

The coupling instruments 13 consist of the two lower points of the universal coupling system of the multifunctional chassis or advantageously of a position that can be adjusted in the vertical plane and/or in the horizontal plane. They are, for example, arranged at the lower end of the vertical arms 17 equipped with several superpositioned holes 17a and mounted in an adjustable manner, in a cover 17b carried by each of the flanges 8a, 8b. A pin 17c or other assembly shaft passing through the holes arranged in the cover 17b and one of the holes 17a makes it possible to lock the arms 17 in the desired position.

The covers 17b are mounted on the flanges 8a, 8b by means of a cylindrical joint 9 and they are connected to the beam 3 by means of reverse double-threaded tension devices 10 affixed by means of their opposite ends and by means of joints, to the covers and to the beam.

It is understood that this mechanism allows the vertical arms 17 to swing around the horizontal or approximately horizontal axis of the cylindrical joint 9 and permits, as a result, an adjustment of the spacing between the two low points (13) of the universal three-point hitch system of the multifunctional chassis of the invention According to a characteristic arrangement of the invention, the distance comprised between the homologous points of attachment allowing the mounting of the multifunctional chassis 1–2 on the universal three-point hitch system of a tractor (attachment points 4, 11—11) and those of the universal three-point hitch system of the multifunctional chassis (attachment points 4, 13—13), is on the order to 0 to 300 mm.

According to another very important characteristic arrangement of the invention, the transverse tool-holder 2 is suspended in a floating manner on the frame 1 designed to be mounted on the universal three-point hitch system of a tractor.

For this purpose, the tool-holders consist of a metallic transverse beam 18 that supports the lateral tools. The ends of this beam are equipped with a cover 19a, 19b, respectively, oriented to the top. In each of these covers, by means of a pivot pin 20a, 20b, one of the ends of a lateral small connecting rod 21a, 21b is articulated, and its other end is connected, by means of a ball-and-socket joint 22a, 22b, to the lower end of the lateral flanges 8a, 8b, respectively.

On one of the sides of the machine (left side), a second small connecting rod 23 arranged parallel and above the small connecting rod 21b, is affixed by means of its opposite ends and by means of ball-and-socket joints 24, 25, on the one hand, to the cover 19b, and, on the other hand, to the flange 8b.

The pair of small connecting rods 21b, 23 and the portions of the cover 19b and the flange 8b comprised between the joints (20b, 24, 22b, 25) of the portions of the cover, make up a deformable parallelogram by which the tool-holder beam 18 cannot swing around its longitudinal axis. The front joints 22b and 25 follow the movements of the tractor T, while the rear joints 20b, 24 follow the movements of the tool-holder 2.

Also, it is known that using this assembly, the tool-holder beam 18 can occupy a variable position in the vertical plane, relative to the frame 1. The mechanisms make it possible to adjust the maximum clearance that it is desired to give to the tool-holder 2.

According to the example shown (FIGS. 8 and 9), these mechanisms are made up of flexible bonds such as simple chains 26, united by welding or otherwise, with the covers 19a and 19b, and hanging on the hooks 27 affixed on the outer side of the flanges 8a and 8b.

The beam 18 constitutes a double slide casing in which are housed, with a capacity for longitudinal sliding, two arms 28a, 28b, for example, made up of superpositioned beams, having a rectangular or other cross-section. The lateral tools of the machine having a multifunctional chassis, designated in their entirety by the references 29A and 29B in FIG. 7, are mounted to the external ends of the sliding arms. Shown in the drawings are, to show the machine according to the invention, useful tools for hoeing work or the like, that are the object of a preceding patent of the applicant; it is specified, however, that this does not involve a restrictive form of the equipment, the machine can be equipped with tools for inter-trunk cultivation of other types, depending on the work to be done.

The translational movements of the tool-holder arms 28a, 28b can be obtained manually or, in an advantageous manner, by means of the hydraulic jacks 30a, 30b connecting the beam 18 to the tool-holder arms and arranged in parallel to the beam. As shown in FIG. 7, the jack 30a connects the beam 18 to the end of the arm 28a, while the jack 30b connects the beam to the end of the arm 28b.

According to another characteristic arrangement of the invention, the ends of the tool-holders 2 are equipped with detectors 31a, 31b arranged in front of the tools 29A, 29B and acting on an electro distributor or similar device that controls the supply to the jacks, by means of an appropriate hydraulic circuit, in order to ensure the axial displacement, synchronized or not, of the arms 28a, 28b and the recentering of the tools relative to the axis in between rows in which the tractor is moving, when one of the detectors encounters an obstacle such as a vinestock, post of a fence, or trunk of a shrub or tree, during work, in case the tractor swerves in between the rows.

The tool-holder consists of mechanisms that make possible the adjustment of the distance between the lateral tools depending on the distance between the rows of the vinestocks of the vineyard or the trunks of the trees or shrubs.

These mechanisms consist of, for example: on the one hand, a first rod 32, united by means of one of its ends to the outside end of the sliding arm 28b and arranged in parallel to the arm and to the jack 30b and, on the other hand, a cylindrical rod 33 provided with a series of holes spaced apart 33a and united by means of one of its ends to the outside end of the sliding arm 28a and arranged in parallel to the arm and to the jack 30a.

The free end of the rod 32 is united with a collar 34, traversed by the rod 33, which is equipped with an annular stop 35 mounted with a freedom of axial displacement along the shaft on which it is affixed by means of a pin 36 or other similar locking shaft passing through one of the holes 33a.

The jacks 30a and 30b tend to push the sliding arms 28a and 28b back permanently in the direction to the outside, in a manner so that the stop 35 is supported on the collar 34, while thus limiting the length of the portion of the arms that is used. It is understood that depending on the site of the fixation of the stop 35 on the rod 33, a length, of the portion of the arms 28a and 28b that is used, is obtained that is more or less sizeable and this determines the distance between the tools 29A, 29B, mounted on the outside ends of the arms.

In FIG. 4, the machine and its tool-holders 2 are shown perfectly centered relative to the axis in between rows, the jacks being supplied with an equal pressure. In this case, the length of the portion of the sliding arms 28a and 28b that is used is identical to each side of the beam 18.

In FIG. 5, the machine has been made to swerve noticeably to the right relative to the axis in between rows In this case, when the right detector has encountered the trunk of the shrub located to the right, it commanded the electrodistributor of the hydraulic circuit of the tool-holder, in a manner so as to put out to the jack 30b a higher oil pressure than the one sent to the jack 30a. In these conditions, the displacement to the left of the rod of the jack 30b and the arm 28b has caused, by means of the rod 32 and the collar 34 in contact with the stop 35 that equips the rod 33, an identical displacement of the arm 28a and the rod of the jack 30a. In these conditions, the tools 29A and 29B keep an identical distance between them, in spite of the swerving of the frame 1 affixed to the tractor.

The synchronized displacement of the sliding arms 28a, 28b stops as soon as the detector is no longer in contact with the obstacle, the lateral tools 29A, 29B are thus perfectly centered in between the rows.

FIG. 6 shows the inclined position of the tool-holders 2 relative to the fixed frame 1, during the passage of the tools 29A and 29B over a banked terrain.

This inclination allowing an automatic adaptation of the position of the tools of the machine on a sloping terrain is made possible due to the floating suspension of the tool-holders 2 by means of the small connecting rods 21a and 21b of the ball-and-socket joints 20a, 22a and 20b, 22b and the chains 26.

The machine according to the invention consists of a speed multiplier 37 whose input shaft is equipped with a connection instrument 38 that makes it possible to couple it to the power take-off shaft of a farm tractor.

According to another characteristic arrangement of the invention, this multiplier consists of, on its opposite side or rear side, an output shaft 39 similar to the power take-off shaft of a tractor and making it possible, by means of a cardan shaft 40, to activate one or more tools of a machine for cultivating or inter-row treatment mounted on the universal three-point hitch system of the multifunctional chassis 1–2 described above.

On the other hand, the multiplier 37 is coupled to two hydraulic pumps 41–42, one of which ensures the driving of the hydraulic motor 43a of one of the lateral tools 29A and the second one ensures the drive of the hydraulic motor 43b of the other lateral tool 29B.

Each pump 41–42 is supplied by an independent oil tank 44a, 44b. These two tanks are installed on the upper beam 3 of the frame 1 and they have, for example, a capacity of forty liters each. This arrangement prevents oil from not being heated to temperatures that are too high due to the high pressures required for the functioning of the driving motors of the lateral tools of the machine, where such an overheating can alter the qualities of the oil and damage the pumps and the motors.

We claim:

1. An apparatus for working soil between aligned rows of trees or shrubs, the apparatus for attachment to a universal three-point hitch of a farm tractor, the apparatus comprising:

a first machine comprising a multi-functional chassis having at a front end thereof a means for mounting to the universal three-point hitch of the farm tractor, said chassis having a lateral mounting means thereon, said lateral mounting means for receiving tools thereon for the working of the soil near trunks of the aligned rows of trees or shrubs, said chassis comprising a three-point hitch system at a rear end thereof; and a second machine having a three-point mounting means thereon for mounting to said three-point hitch system of said first machine, said second machine having a tool means thereon for working the soil between the rows of trees or shrubs, said second machine workable simultaneously with said first machine, said three-point hitching system of said multi-functional chassis having coupling instruments at two lower coupling points thereof, said coupling instruments being adjustable in a vertical plane so as to allow movement of said second machine in a vertical plane relative to said multi-functional chassis.

2. The apparatus of claim 1, said multi-functional chassis comprising a frame and a tool holder suspended by said frame in a floating manner, said frame having said means for mounting thereon, said tool holder supporting said tools of said lateral mounting means.

3. The apparatus of claim 2, further comprising:

a pair of connecting rods affixed laterally by opposite ends thereof by respective joints to said frame and to said tool holder.

4. The apparatus of claim 3, said pair of connecting rods arranged on lateral sides of said frame so as to form a deformable parallelogram.

5. The apparatus of claim 3, said joints being respective ball-and-socket joints.

6. The apparatus of claim 2, said frame holder having hooks extending therefrom, the apparatus further comprising:

a plurality of chains hanging from said hooks and connected at an opposite end to said tool holder.

7. The apparatus of claim 2, said tool holder having a pair of mobile arms extending transversely therefrom, said pair of mobile arms being said lateral mounting means, said pair of mobile arms supporting respectively the tools on the ends thereof, the apparatus further comprising:

detector means affixed to the ends of said pair of mobile arms, said detector means for controlling an axial displacement of said pair of mobile arms.

8. The apparatus of claim 7, further comprising:

a pair of jacks connected respectively to said pair of mobile arms, said pair of jacks urging said pair of mobile arms outwardly;

a rod having one end connected to an outer end of one of said pair of mobile arms and arranged in parallel to the arm and to one of said pair of jacks, said end of said rod having a collar thereon; and a shaft extending through said collar, said shaft having a series of spaced-apart holes, said shaft having one end connected to an, outer end of another said pair of mobile arms, said shaft arranged in parallel to said another of said pair of mobile arms and to another of said pair of jacks, said shaft having a annular stop axially displaceable thereon, said annular stop being affixed by a locking instrument so as to rest on said collar.

9. The apparatus of claim 1, said means for mounting to the universal three-point hitch of the farm tractor being in a first vertical plane, said three-point hitching system of said multi-functional chassis being in a second vertical plane, said first vertical plane being spaced by between 0 and 300 millimeters from said second vertical plane.

10. The apparatus of claim 1, further comprising:

at least one hydraulic pump; and a speed multiplier drivingly connected to the hydraulic pump, said speed multiplier having an input shaft with a linkage means thereon, said linkage means for connecting said input shaft to a power take-off of the farm tractor, said speed multiplier having an output shaft at a rear side thereof, said output shaft having a cardan drive means thereon, said cardan drive means for actuating said tool means of said second machine.

11. The apparatus of claim 10, further comprising:

a first lateral tool affixed to one end of said lateral mounting means;

a second lateral tool affixed to an opposite end of said lateral mounting means;

a first hydraulic motor drivingly connected to said first lateral tool;

a second hydraulic motor drivingly connected to said second lateral tool;

a first hydraulic pump connected to said first hydraulic motor;

a second hydraulic pump connected to said second hydraulic motor; and a pair of oil tanks connected to said first and second hydraulic pumps so as to supply oil to at least one of said first and second hydraulic pumps.

12. The apparatus of claim 1, further comprising:

adjustment means connected to said three-point hitching system of said multi-functional chassis, said adjustment means for adjusting a position of said two lower coupling points in said vertical plane.

13. The apparatus of claim 1, further comprising:

adjustments means connected to said three-point hitching system of said multi-functional chassis, said adjustment means for adjusting a distance between said two lower coupling points.

* * * * *